United States Patent [19]

Uchida et al.

[11] Patent Number: 5,714,868
[45] Date of Patent: Feb. 3, 1998

[54] BATTERY PACK AND CHARGER ARRANGEMENT WHICH INTERMITTENTLY MONITORS BATTERY TEMPERATURE DURING RECHARGING AND A METHOD THEREOF

[75] Inventors: Akiko Uchida, Saitama; Osamu Yamashita, Tokyo, both of Japan

[73] Assignee: NEC Corporation, Tokyo, Japan

[21] Appl. No.: 654,662

[22] Filed: May 29, 1996

[30] Foreign Application Priority Data

May 29, 1995 [JP] Japan .................... 7-130143

[51] Int. Cl.$^6$ .................... H01M 10/44; H01M 10/46
[52] U.S. Cl. .................... 320/21; 320/35; 320/39
[58] Field of Search .................... 320/21, 22, 30, 320/35, 36, 39, 40, 48

[56] References Cited

U.S. PATENT DOCUMENTS

| | | | |
|---|---|---|---|
| 4,649,333 | 3/1987 | Moore | 320/35 X |
| 4,692,682 | 9/1987 | Lane et al. | 320/35 |
| 5,291,118 | 3/1994 | Kojima | 320/35 |

FOREIGN PATENT DOCUMENTS

| | | |
|---|---|---|
| 4-210738 | 7/1992 | Japan . |
| 5-13108 | 1/1993 | Japan . |

*Primary Examiner*—Edward Tso
*Attorney, Agent, or Firm*—Ostrolenk, Faber, Gerb & Soffen, LLP

[57] ABSTRACT

In order to enable a simple arrangement wherein only two terminals are provided on a battery pack for recharging a battery and sensing the battery temperature, the charger is arranged to intermittently interrupt a constant current supply used to recharge the battery and to apply, during the interruption, a predetermined low constant voltage to the two terminals so as to sample the voltage of a thermistor which is disposed in immediate proximity of the secondary battery.

12 Claims, 4 Drawing Sheets

BATTERY PACK AND CHARGER ARRANGEMENT WHICH INTERMITTENTLY MONITORS BATTERY TEMPERATURE DURING RECHARGING AND A METHOD THEREOF

BACKGROUND OF THE INVENTION

1. Field of the Invention

The present invention relates generally to improvements in monitoring or sampling battery temperature while a battery is being recharged, and more specifically to an improved technique which intermittently senses battery temperature using the terminals which are also used for battery recharging.

2. Description of the Related Art

Secondary batteries have found very extensive application in a variety of industrial fields in that they are rechargeable. A secondary battery is alternatively known as a storage battery or an electric accumulator.

Before turning to the present invention it is advantageous to briefly discuss, with reference to FIG. 1, a known secondary battery pack including a battery (or cell) and a thermistor for measuring the battery temperature.

As shown in FIG. 1, a secondary battery pack 10 is provided with a secondary battery 12, a thermistor 14, and three terminals 16a, 16b and 16c. The battery 12 is coupled to the terminals 16a and 16c, while the thermistor 14 is coupled to the terminals 16b and 16c for outputting battery temperature information. As is well known, a thermistor is a temperature-sensitive semiconductor device possessing a negative temperature coefficient. A known technique similar to the arrangement of FIG. 1 is disclosed in Japanese Laid-open Patent Applications Nos. 4-210738 and 5-13108.

When the battery 12 is to be recharged, the battery pack 10 is attached to a battery charger 18 by electrically coupling the terminals 16a–16c to the counterpart terminals 20a–20c of the battery charger 18, respectively. Although not shown in detail in FIG. 1, the charger 18 is supplied with suitable main electricity applied from a commercial ac (alternating current) line, a vehicle's cigarette lighter, or the like. The electric power applied to the charger 18 is irrelevant to the present invention and thus a further description thereof is omitted for brevity. The battery 12 is recharged by passing a direct current, by way of the terminals 16a and 16c, through the cell in the opposite direction (depicted by an arrow 22) to that which occurs during discharge.

In the case where the secondary battery 12 is of the nickel-cadmium (or nicad) cell type, it is difficult to reliably measure when the battery is fully charged by monitoring a terminal voltage of the battery under recharge. This is because the full charge voltage changes with repetitive cycling, environmental temperature, charging rate, etc.

In order to determine the time when the nicad cell has already been fully charged, a temperature-sensitive semiconductor device such as a thermistor is used and provided in the immediate vicinity of the cell. A nicad cell has an internal chemistry that causes it to produce heat once it is fully recharged and hence, a fully charged condition of a nicad cell can be detected by monitoring its temperature and detecting a rise exceeding a predetermined value.

However, the above mentioned known battery pack 10 inherently requires the third terminal 16b which is dedicated to the battery temperature sensing. Therefore, in order to simplify the battery pack 10 by reducing the number of parts and connection wires, it is highly desirable to omit this third terminal which is only used for the temperature monitoring.

Further, even if the secondary battery is a type whose full charge condition can be determined by monitoring the battery's terminal voltage instead of the above mentioned cell temperature, it is frequently necessary to detect battery temperature during the recharging operation for safety reasons. Even in this case, it is preferable to omit the terminal 16b which is solely devoted or dedicated to the battery temperature sensing.

Accordingly, what is desired is to simplify the arrangement of the secondary battery pack by eliminating the terminal used solely for the purpose particular to the battery temperature sensing.

SUMMARY OF THE INVENTION

It is therefore an object of the present invention to provide a secondary battery pack and charger which in combination enable the omission of the battery pack terminal which is dedicated solely to the battery temperature detection.

Another object of the present invention is to provide a method of omitting the battery pack terminal which is dedicated solely to the battery temperature.

These objects are fulfilled by a technique that enables a simple arrangement wherein only two terminals are provided on a battery pack for recharging a battery and sensing the battery temperature. The charger is arranged to intermittently interrupt a constant current supply used to recharge the battery and to apply, during the interruption, a predetermined low constant voltage to the two terminals so as to sample the voltage of a thermistor which is disposed in immediate proximity of the secondary battery.

More specifically, a first aspect of the present invention resides in a battery pack and charger assembly which includes a battery pack and a battery charger, the battery pack including a secondary battery and being coupled to the battery charger when the secondary battery recharges, the battery pack comprising: a first terminal; a second terminal coupled to a negative electrode of the secondary battery; a diode having an anode coupled to the first terminal and a cathode coupled to a positive electrode of the secondary battery; and a thermistor provided to monitor a temperature of the secondary battery and having opposite ends coupled respectively to the first and second terminals.

A second aspect of the present invention resides in a battery pack and charger arrangement comprising: a battery pack having only first and second terminals and including a rechargeable battery and a thermistor and a diode, the battery and thermistor being connected in parallel between the first and second terminals, the diode having an anode being connected to the first terminal and a cathode being connected to a negative electrode of the battery; a battery charger having only third and fourth terminals, the third and fourth terminals being adapted for connection with the first and second terminals respectively, the battery charger including: a source of constant current; a source of constant low voltage; switch means for alternatively switching connection between the third and fourth terminals and the source of constant current and the source of constant low voltage; and thermistor voltage detection means for sensing the voltage across the third and fourth terminals while the switching means connects the source of constant low voltage with the third and fourth terminals.

A second aspect of the present invention resides in a method of monitoring a temperature of a secondary battery provided in a battery pack while a charger recharges the secondary battery, the battery pack having only first and second terminals and further including a thermistor for sensing the temperature, the method comprising the steps of: applying a constant current, generated in the charger, to the secondary battery for recharging the secondary battery via the first and second terminals of the battery pack, the constant current flowing into the second battery via a diode; intermittently interrupting the application of the constant current to the secondary battery; applying a constant voltage, generated in the charger, to the thermistor while the application of the constant current to the secondary battery is interrupted, the thermistor having terminals coupled to the first and second terminals of the battery pack; and monitoring a voltage developed across the thermistor in response to the constant voltage applied to the thermistor while the application of the constant current to the secondary battery is interrupted.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A first embodiment of the present invention is described with reference to FIGS. 2-3. The instant embodiment is directed to the detection of a full charge condition of a secondary battery which has characteristics wherein the cell temperature begins to rise when the cell is fully charged. Merely by way of example, a nickel-cadmium cell is referred to which exhibits such temperature characteristics.

A battery pack 30, when it is to be recharged, is detachably coupled to a battery charger 32 by way of their terminals 34a–34b and 36a–36b.

Figure 1:
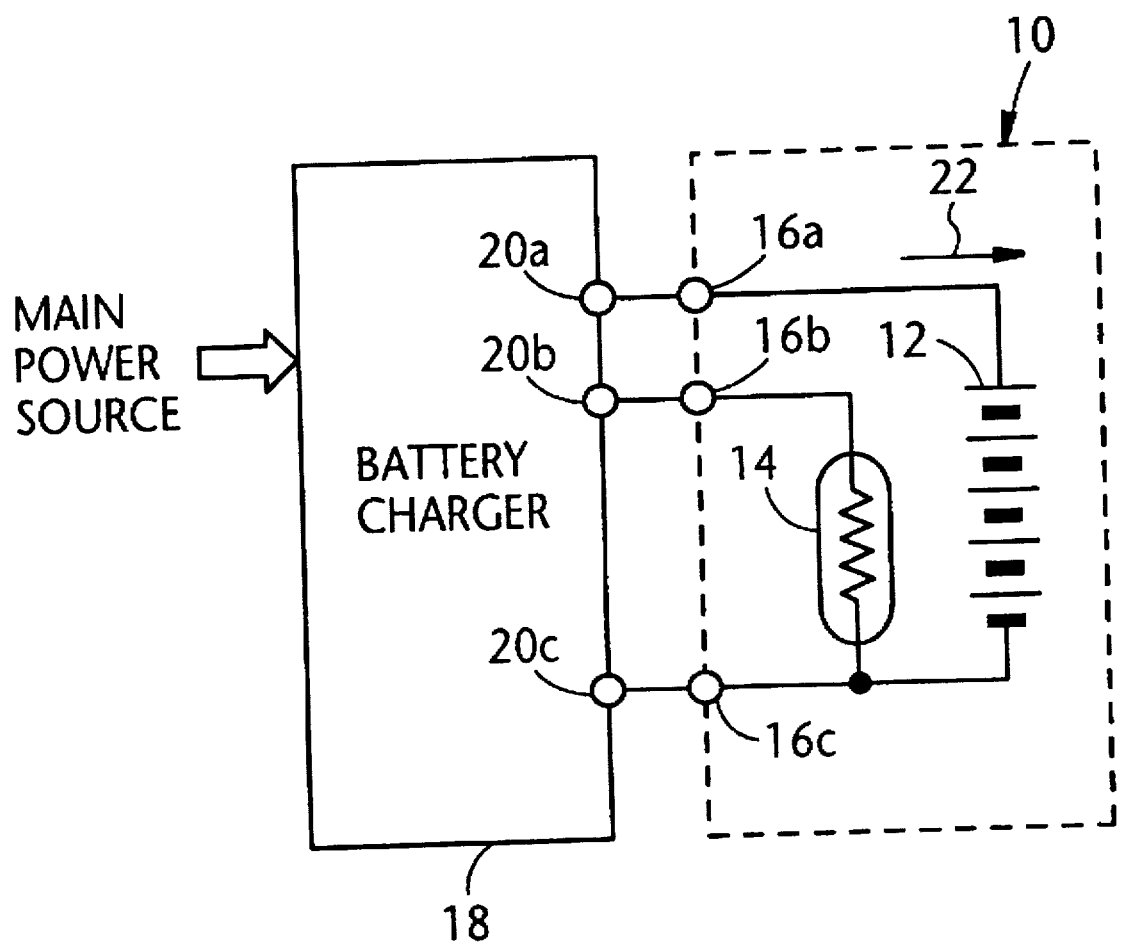
FIG. 1 is a diagram showing a known battery pack coupled to a battery charger, which was referred to in the opening paragraphs of this disclosure.

The battery pack 30 is comprised of, in addition to the terminals 34a–34b, a secondary battery 38, a diode 40, and a thermistor 42 which is deposited close to the battery 38. On the other hand, the battery charger 32 includes the aforesaid terminals 36a and 36b, a constant current generator 44, a constant voltage generator 46, a resistor 48, a pulse generator 50, a switch 52, a thermistor voltage detector 54, and a full charge indicator 56, all of which are coupled as illustrated. As in the prior art of FIG. 1, the charger 32 is supplied with electricity from a suitable main power source.

When the battery pack 30 is initially coupled to the charger 32, the constant current generator 44 begins issuing a predetermined constant current. The pulse generator 50 is responsive to the presence of the current on a line 45 and generates a switch control signal (depicted by Scon) which is a train of pulses as shown in FIG. 3. It is to be noted that the aforesaid detection of the coupling of two devices is merely exemplary and the present invention is not directly concerned with a manner of how to detect the pack 30 being initially coupled to the charger 32.

The control signal Scon is composed of a train of pulses which occur at predetermined timer intervals. Each pulse width is markedly narrower than the time interval between the pulse occurrences. By way of example, each pulse has a width of few seconds and occurs at the predetermined time interval of few minutes. As will be discussed in detail, the battery 38 is charged during the time intervals between pulses, while the thermistor voltage is measured during the actual pulse. While the thermistor voltage is measured or sampled, the battery charging is temporarily interrupted. Since the battery voltage rises gradually as the battery charges, the short time interval (viz., pulse width) with which the thermistor voltage is repetitively monitored does not adversely affect the overall battery charging.

The control signal Scon is applied to both the switch 52 and the thermistor voltage detector 54.

The switch 52 is responsive to the low level of the signal Scon and couples the constant current generator 44 to the battery pack 30 by way of the terminals 36a and 34a. On the contrary, the switch 52, in response to the high level (viz., pulse) of the signal Scon, couples the constant voltage generator 46 to the battery pack 30. The generator 46 issues a constant voltage V1 which is lower than a fully discharged battery voltage (depicted by V2).

The thermistor 42 has high impedance as compared with the forward resistance of the diode 40 and the internal resistance of the battery 38. Thus, while the switch 52 selects the constant current generator 44, a constant current flows into the battery 38 for recharging. On the other hand, while the switch selects the constant voltage generator 46, the constant voltage V1 is applied to the thermistor 42 in that the voltage V1 is lower than the fully discharged battery voltage V2. A voltage developed across the thermistor 42 is measured at the thermistor voltage detector 54 in synchronism with (or in response to) each pulse applied to the pulse generator 56. The thermistor voltage (depicted by Vth) is given by $$Vth = V1 \cdot Rth/(Rth+R) \qquad (1)$$

where R: resistance of resistor 48; and

Rth: resistance of thermistor 42. Rewriting equation (1), the resistance Rth is represented as follows:

$$Rth = Vth \cdot R/(V1-Vth) \qquad (2)$$

The values of R and V1 are previously known. Therefore, when the voltage detector 54 detects Vth, the resistance Rth of the thermistor 42 is defined using equation (2).

It can be previously known to the circuit designer to what battery temperature the thermistor voltage corresponds by referring to the data sheet which is available at a thermistor's manufacturer. Therefore, it is in practice unnecessary to calculate the value of Rth each time the detector 54 receives the thermistor voltage.

It is well known in the art to design the circuitry for determining the thermistor's ambient temperature based on the thermistor voltage Vth and hence, further descriptions thereof will be omitted for the sake of brevity.

Figure 2:
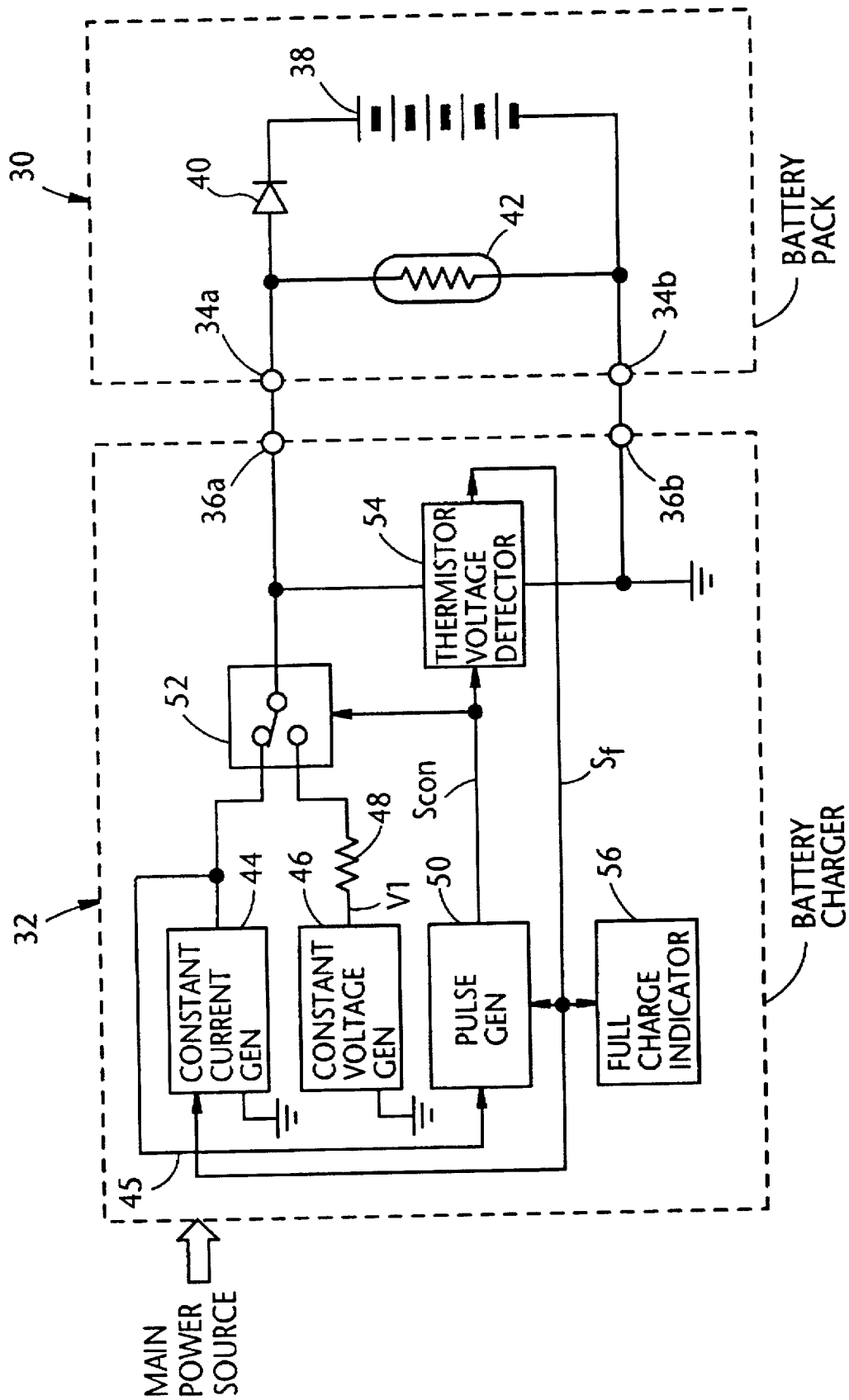
FIG. 2 is a diagram showing a first preferred embodiment of the present invention in block diagram form.
Figure 3:
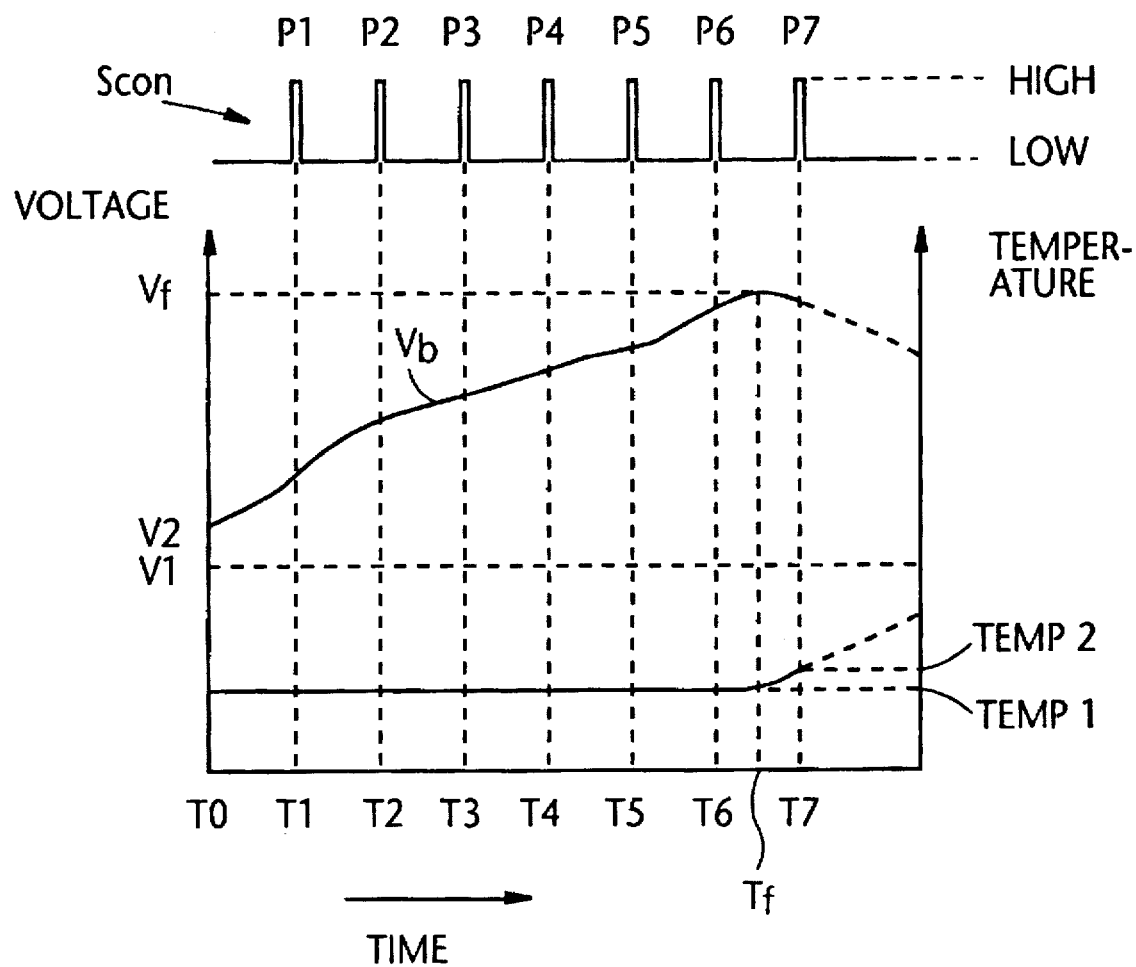
FIG. 3 is a diagram showing operations of the first embodiment.

The operations of the first embodiment shown in FIG. 2 are further discussed with reference to FIG. 3.

It is assumed that the battery 38 is fully discharged and the battery pack 30 is coupled to the charger 32 for recharging the battery 38. As mentioned above, the constant voltage V1 outputted from the voltage generator 46 is below the fully discharged voltage V2. It is further assumed that the recharging begins at a time point T0. If it takes one hour for the charger 32 to fully recharge the battery 38 and if the pulse period is 30 seconds (=(3 seconds of pulse width)+(27 seconds of pulse interval)), the pulse generator 50 issues about 120 pulses per one hour. However, in FIG. 3, only seven pulses P1-P7 are shown merely for the sake of simplifying the drawing.

The pulses P1-P7 are respectively generated at time points T1-T7 and controls the switch 52 such as to have the voltage detector 54 measure the thermistor voltage. The thermistor voltage is detected by applying the constant voltage V1 to the thermistor 42. The battery voltage (depicted by Vb in FIG. 3) gradually rises as the battery 38 is charged and eventually reaches the fully charged potential (depicted by Vf) at a time point Tf.

Until the battery 38 is fully charged, the battery temperature remains at a constant value TEMP1 which is indirectly detected by the voltage detector 54. On the other hand, after the battery 38 reaches its fully charged state, electrical energy is no longer converted into chemical energy (viz., is not used for raising battery voltage) and instead raises the battery temperature.

The voltage detector 54 determines, while interrupting the application of the constant current to the battery 38, if the thermistor voltage has reached the fully charged state by monitoring the battery temperature. In the illustrated case, the fully charged state is detected at time point T7 when the voltage detector 54 detects the thermistor voltage which indicates a temperature equal to or more than a predetermined value TEMP2.

Upon detecting the fully charged state of the battery 38, the voltage detector 54 generates a signal Sf which indicates the full charge and which is applied to the constant current generator 44, the pulse generator 50, and the full charge indicator 56.

The pulse generator 50 responds to the signal Sf and controls the switch 52 so as to continue to select the constant current generator 44. Further, the signal Sf induces the full charge indicator 56 to energize a suitable indicator (not shown) installed therein. For example, an indicator such as an LED (light emitting diode).

Although no problem may be caused by overcharging the battery (if it is a nicad cell), it is still preferable to switch over to a "trickle" charge upon a full charge being attained. To this end, the signal Sf is used to have the constant current generator 44 switch over from a normal charge mode to a trickle charge mode.

Figure 4:
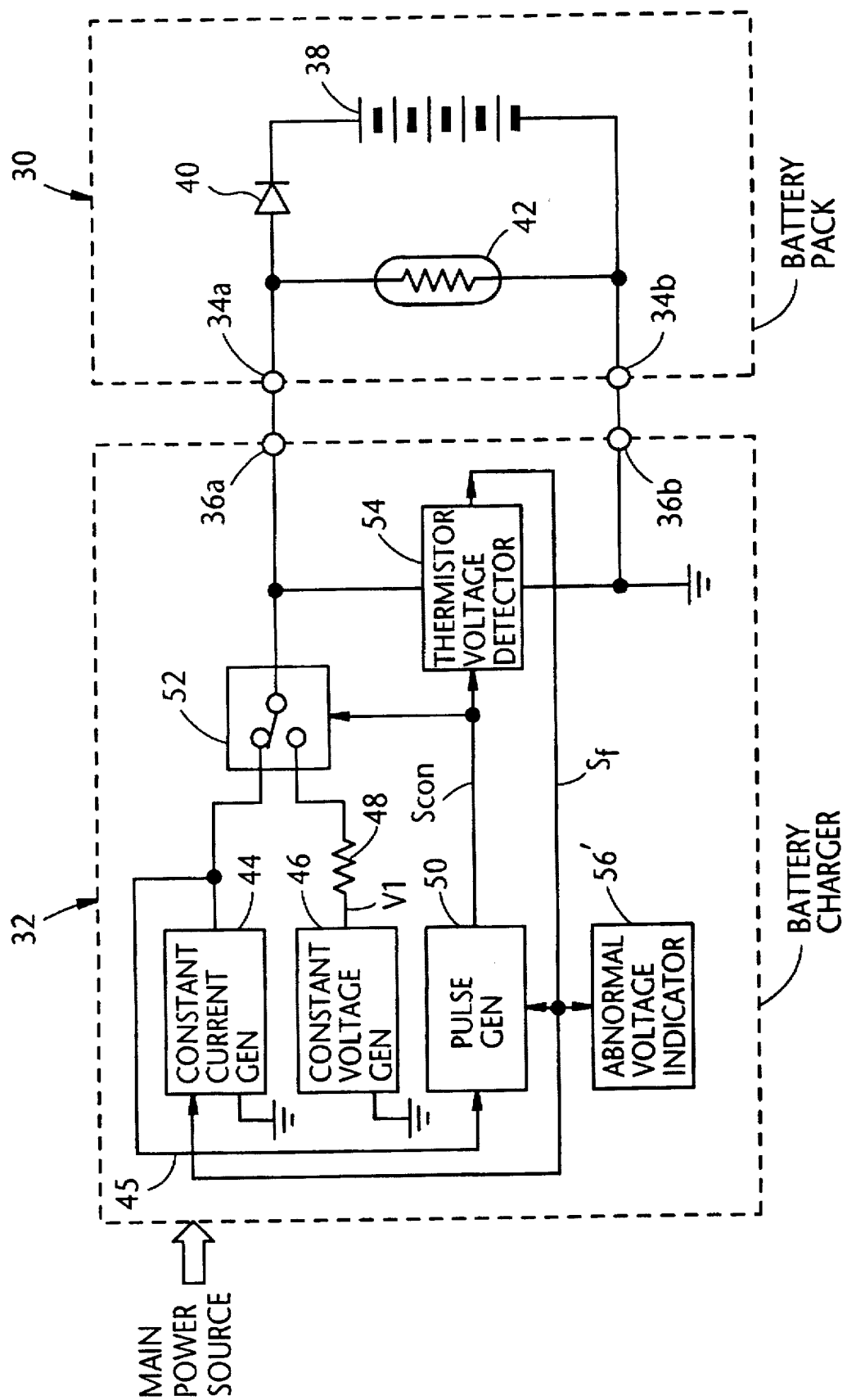
FIG. 4 is a diagram showing a second embodiment of the present invention in block diagram form.

A second embodiment of the present invention is discussed with reference to FIG. 4.

The second embodiment differs from the first one in that the second embodiment includes an abnormal voltage indicator 56' in place of the full charge indicator 56. The second embodiment is used in the case wherein the secondary battery is of a type whose full charge condition can be determined by monitoring the battery's terminal voltage instead of the above mentioned cell temperature. Even in such a case, it is very important to detect battery temperature during recharging from a safety point of view. The instant embodiment finds extensive use in that it is possible to omit the terminal 16b, thereby simplifying the battery pack with the attendant result of reducing manufacturing costs.

In the above discussion, the pulse generator 50 is activated to issue a train of pulses immediately after the charger begins recharging the battery 38. As an alternative, the pulse generator 50 issues a train of pulses after a predetermined time elapses from the recharging.

It will be understood that the above disclosure is representative of only two possible embodiments of the present invention and that the concept on which the invention is based is not specifically limited thereto.

What is claimed is:

1. A battery pack and charger assembly which includes a battery pack and a battery charger, said battery pack including a secondary battery and being coupled to said battery charger when said secondary battery recharges, said battery pack comprising:

a first terminal a second terminal coupled to a negative electrode of said secondary battery;

a diode having an anode coupled to said first terminal and a cathode coupled to a positive electrode of said secondary battery; and a thermistor provided to monitor a temperature of said secondary battery and having opposite ends coupled respectively to said first and second terminals;

and said battery charger comprising:

a third terminal connectable to said first terminal;

a fourth terminal connectable to said second terminal;

first means for recharging said secondary battery using a constant current and intermittently interrupting the constant current and applying a constant voltage across said thermistor via said third and fourth terminals, said constant voltage being below a fully discharged voltage of said secondary battery; and a voltage detector for monitoring a voltage developed across said thermistor in response to application of said constant voltage to said thermistor, said voltage detector detecting said temperature of said secondary battery based on the voltage monitored thereby.

2. An assembly as claimed in claim 1, wherein said first means includes:

second means (44) for generating said constant current;

third means (46) for generating said constant voltage;

fourth means (50) for generating a switch control signal;

switch means responding to said switch control signal and alternately coupling said second and third means to said battery pack through said third terminal.

3. An assembly as claimed in claim 2, wherein said switch control signal is a train of pulses, said switch means responding to each of said pulses and selecting said third means for the duration of each of said pulses.

4. An assembly as claimed in claim 1, wherein the voltage monitored by said voltage detector is used to determine complete recharge of said secondary battery.

5. An assembly as claimed in claim 1, wherein the voltage monitored by said voltage detector is used to determine an abnormal temperature rise of said secondary battery.

6. A battery pack and charger arrangement comprising:

a battery pack having only first and second terminals and including a rechargeable battery and a thermistor and a diode, said battery and thermistor being connected in parallel between said first and second terminals, said diode having an anode being connected to said first terminal and a cathode being connected to a negative electrode of said battery;

a battery charger having only third and fourth terminals, said third and fourth terminals being adapted for connection with said first and second terminals respectively, said battery charger including:

a source of constant current;

a source of constant low voltage;

switch means for alternatively switching connection between said third and fourth terminals and said source of constant current and said source of constant low voltage; and thermistor voltage detection means for sensing the voltage across said third and fourth terminals while said switching means connects said source of constant low voltage with said third and fourth terminals.

7. A method of monitoring a temperature of a secondary battery provided in a battery pack while a charger recharges said secondary battery, said battery pack having only first and second terminals and further including a thermistor for sensing said temperature, said method comprising the steps of:

generating a constant current in said charger;

applying said constant current to said secondary battery for recharging said secondary battery via said first and second terminals of said battery pack, said constant current flowing into said second battery via a diode;

intermittently interrupting the application of said constant current to said secondary battery;

generating a constant voltage in said charger, said constant voltage being lower than a fully discharged voltage of said secondary battery;

applying said constant voltage to said thermistor while the application of said constant current to said secondary battery is interrupted, said thermistor having terminals coupled to said first and second terminals of said battery pack; and monitoring, at said charger, a voltage developed across said thermistor in response to said constant voltage applied to said thermistor while the application of said constant current to said secondary battery is interrupted.

8. A battery pack and charger arrangement comprising:

a battery pack having only first and second terminals and including a rechargeable battery and a thermistor and a diode, said battery and said thermistor being connected in parallel between said first and second terminals, said diode having an anode being connected to said first terminal and a cathode being connected to a negative electrode of said battery;

a battery charger having only third and fourth terminals which are respectively adapted for connection with said first and second terminals, said battery charger including:

a source of constant current;

a source of constant voltage, which source generates a constant voltage lower than a fully discharged voltage of said battery;

a control signal generator for generating a control signal taking a form of a train of pulses;

switch means for:

selecting said source of constant current between said pulses of said control signal, so as to charge said battery via said first to fourth terminals; and for selecting said source of constant voltage during each pulse of said control signal, so as to apply said constant voltage to said thermistor via said first to fourth terminals; and thermistor voltage detection means for sensing the voltage across said thermistor while said source of constant voltage is selected by said switch means.

9. A battery pack and charger arrangement as claimed in claim 8, wherein the voltage sensed by said thermistor voltage detecting means is used to determine complete recharge of said battery.

10. A battery pack and charger arrangement as claimed in claim 8, wherein the voltage sensed by said thermistor voltage detecting means is used to determine an abnormal temperature rise of said battery.

11. A battery pack and charger arrangement as claimed in claim 8, wherein said train of pulses comprises regular pulses of predetermined intervals.

12. A battery pack and charger arrangement as claimed in claim 11, wherein a pulse width is narrower than an interval between pulses.

* * * * *